Nov. 20, 1945.　　T. A. OLSON ET AL　　2,389,535

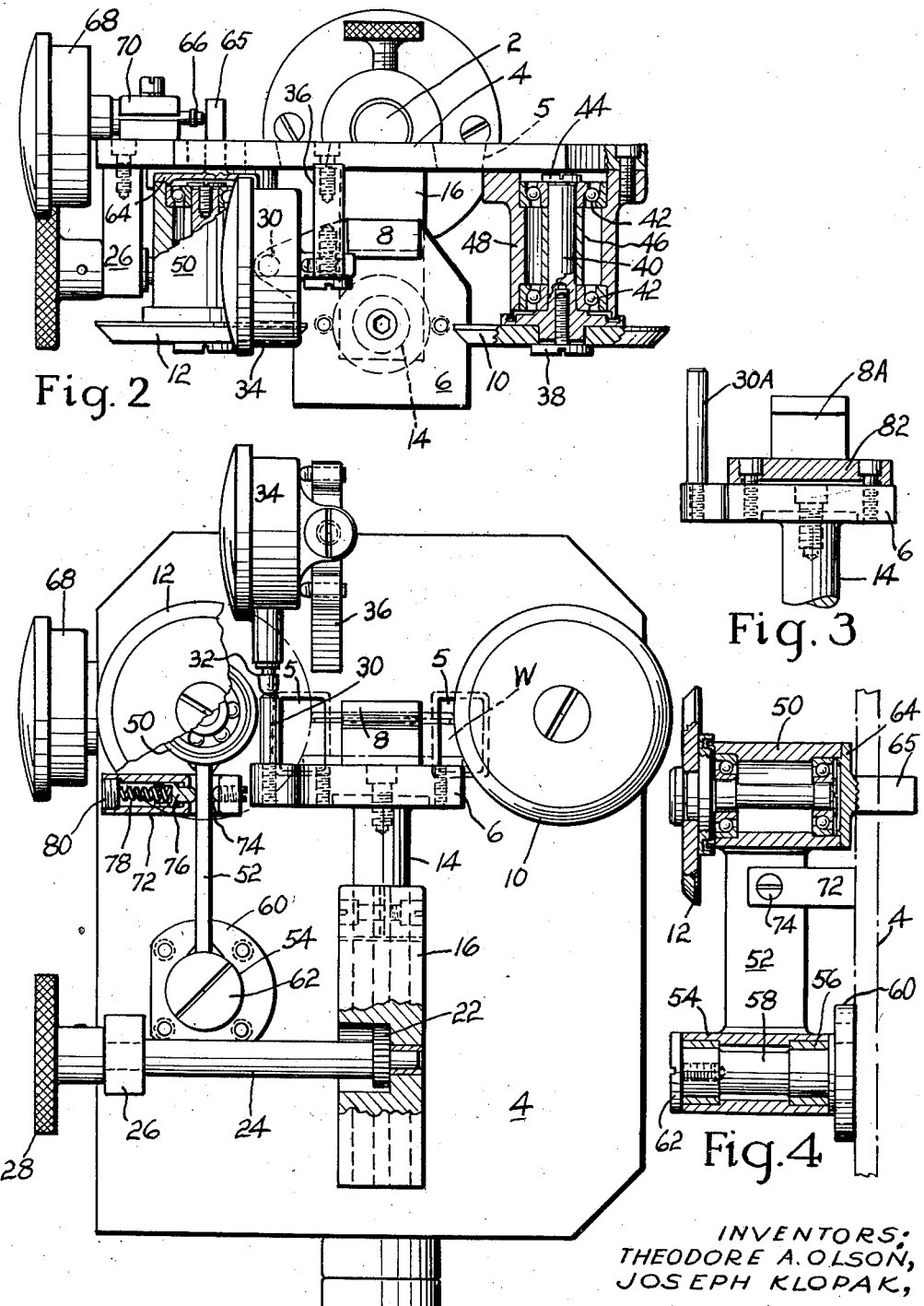

GAUGING

Filed Aug. 7, 1942　　2 Sheets-Sheet 2

INVENTORS:
THEODORE A. OLSON,
JOSEPH KLOPAK,
BY Romeyn A. Spare
THEIR ATTORNEY.

Patented Nov. 20, 1945

2,389,535

UNITED STATES PATENT OFFICE 2,389,535

GAUGING

Theodore A. Olson, Pompton Plains, and Joseph Klopak, Newark, N. J., assignors to General Motors Corporation, Detroit, Mich., a corporation of Delaware Application August 7, 1942, Serial No. 454,055

6 Claims. (Cl. 88—24)

This invention relates to gauging and comprises all of the features of novelty herein disclosed. An object of the invention is to provide an improved apparatus for inspecting contours, as to determine their acceptability for shape, size, location, uniformity and accuracy, any or all of these conditions at one observation. Herein the apparatus is illustrated by reference to the gauging and inspecting of raceway curvature on inner race rings of barrel roller bearings but is applicable to other things.

Inner race rings of barrel roller bearings have a transversely curved raceway forming a concave surface of revolution which must be accurately formed and correctly located for proper co-operation with the bearing rollers and outer race ring. The contour or shape should not only be accurate but it should have a correct location with respect to the end face of the bearing ring and with respect to the axis thereof. The present invention determines these conditions by picturing them in magnified form on a screen, light rays being passed between opposite sides of the raceway and a pair of gauging discs of slightly different radii of curvature. The disc of greater radius represents the maximum acceptable radius of curvature and the other the minimum acceptable radius. If the raceway fits either disc or has a radius of curvature falling between those of the two discs it is acceptable. A magnified image of the space indicates the conditions at a glance.

In the drawings

Fig. 1 is a front elevation of the apparatus, some parts being broken away or in section.

Fig. 2 is a plan view with portions of the gauge disc mountings in section.

Fig. 3 is a front view of a modification.

Fig. 4 is chiefly a vertical sectional view of the mounting for the movable gauge disc.

Figure 5:
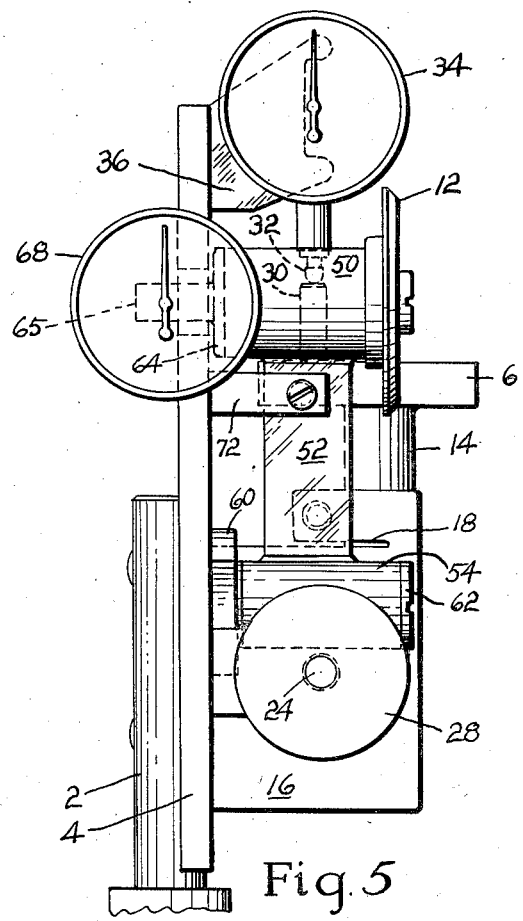
Fig. 5 is a left hand end elevation of Fig. 1.
Figure 6:
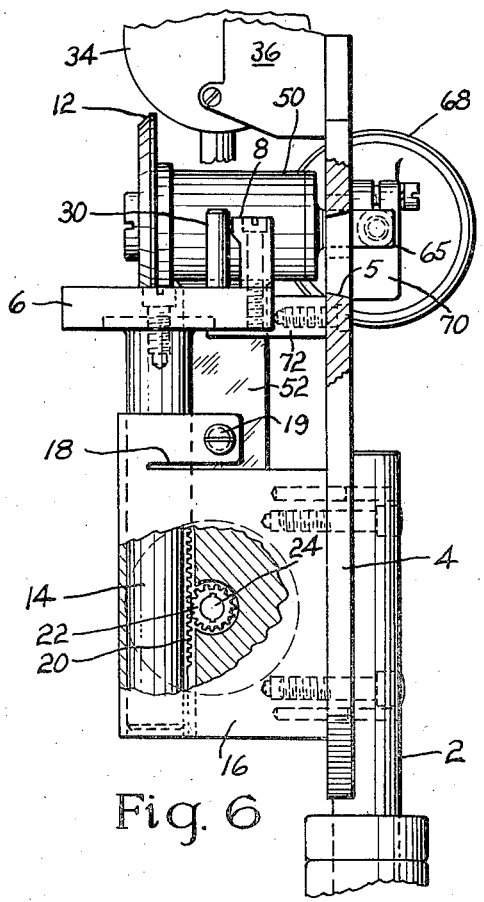
Fig. 6 is a right hand end elevation of Fig. 1, a portion being broken away and in section.

A socketed pedestal carries an upright supporting post 2 which is slabbed off at the front and secured to a flat vertical supporting plate 4 on which all of the mechanism is supported except the optical apparatus. The supporting plate has a pair of openings 5 for the purpose of letting light pass through. A work piece W, indicated in broken lines in Fig. 1 as the inner race ring of a barrel roller bearing, is supported horizontally upon a table 6, the ring resting at the rear against a back rest or guide 8 while the concave raceway is gauged at diametrically opposite points by a right hand gauge disc 10 and a left hand gauge disc 12. The radii of the discs differ by about ½ of 1% or approximately six one-thousandths of an inch.

Figure 7:
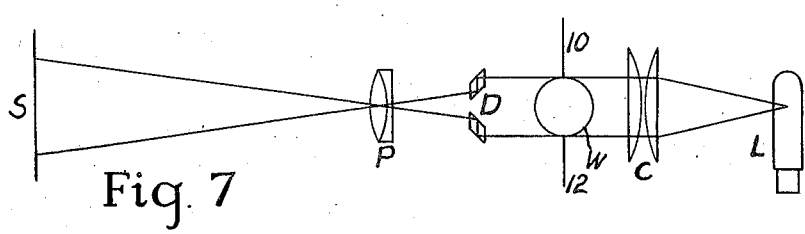
Fig. 7 is a diagram.

As indicated diagrammatically in Fig. 7, light from a lamp L passes through condenser lenses C and tries to pass between the concave work surface and the gauging blades or discs 10 and 12 to a pair of prisms D which bring the light rays in closer to the center line and, from these prisms, the light passes through a projecting lens P to a screen S at a distance where the image of any existing spaces will be magnified.

The table 6 is removably fastened by a screw to the flanged upper end of a vertical slide bar 14 which is vertically adjustable in an opening of a guide block 16 fastened to the front of the supporting plate 4. A portion of the upper part of the guide block projects above a kerf 18 to form a clamp co-operating with a clamping screw 19 to secure the slide bar in vertically adjusted position. The slide bar is vertically adjusted by a rack 20 fastened by screws thereto and engaging a pinion 22 pinned to a reduced portion of a shaft 24 which is journalled in a bushing of the guide block 16 and in a bushing of a block 26 fastened on the front of the supporting plate 4. The shaft is turned by a knob 28 to place the table at the proper elevation. To indicate the proper height, a post 30 extends upwardly from a laterally projecting lug on the table 6 and engages the stem 32 of an indicator 34 secured by a bracket 36 to the front of the supporting plate 4.

Both gauge discs are freely rotatable but this is merely for the purpose of bringing different portions of the periphery into operative position at intervals, thus to distribute wear on the thin gauging edge. The right hand gauge disc 10 is fastened by a screw 38 on a cylindrical extension of a flanged spindle 40 which is journalled in a pair of spaced ball bearings 42 whose inner race rings are secured on the spindle by a screw 44, a spacer 46 extending between the inner race rings. The outer race rings are secured in counterbores in a spindle housing 48 which is secured by screws to the front of the supporting plate 4.

The left hand gauge disc 12 is similarly mounted on ball bearings in a movable spindle housing 50 welded to the upper end of a flat vertical arm 52 whose lower end is welded to an axially extending hub or sleeve 54 journalled on a pair of bushings 56 carried on a round stud 58 which has a flange 60 fastened by screws to the front of the supporting plate 4. The hub 54 is prevented from slipping off the bushings by a screw 62 threaded in the end of the stud 58. The spindle housing 50 has a rear cap 64 with a projection 65 extending through an opening in the supporting plate 4 and engaging the horizontal stem 66 of an indicator 68 which is secured by a clamping bracket 70 to the rear of the supporting plate 4, the indicator being used to compare diameters. The vertical arm 52 passes through a vertical notch in a guide block 72 mounted on the front of the supporting plate 4 and abuts against an adjustable abutment screw 74 against which the arm is urged by a pressure pin 76 sliding in a recess of the guide block and cupped to receive a coil spring 78 which reacts against a screw plug 80.

To provide for work of different sizes, various parts of the apparatus are removable and replaceable by others. Circular elevation pads 82 (Fig. 3) of selected thicknesses may be secured interchangeably on the top of the table 6. Selected extension posts 30A and back rests 8A of selected heights may replace the post 30 and the back rest 8. Also, the table 6 can be removed and replaced with one of different area and the blades or gauging discs 10 and 12 are removable for exchange with gauging discs having different radii of curvature. When the slots 5 are not correctly located for the particular diameter of work, another supporting plate 4 having properly spaced slots may be substituted.

A dummy or master piece is used in setting up the machine, this dummy preferably having its raceway made to fit the right hand disc 10 which has the maximum acceptable radius. This dummy or master piece is laid on the table 6 and the latter is vertically adjusted until the raceway fits the right hand disc, the left hand or smaller radiused gauge disc 12, which is mounted on the swingable housing 50, taking whatever position it will. The table 6 is clamped temporarily in this position by the clamping screw 19. The back rest or guide 8 locates the center of the piece in the vertical plane of the gauging edges of the discs. These edges thus extend along the raceway in an axial plane of the piece and on opposite sides of a diameter. The discs are located radially beyond the outer periphery of the piece and the line of contact between the edge of each disc and the piece is maintained in the axial plane of the piece and in a plane perpendicular to the axis of the disc. Light will be shut out completely between the master piece and the maximum radiused disc 10 but a streak of light interrupted in the middle will show on the screen between the master piece and the other disc of smaller radius. The indicators 34 and 68 are then set to read zero. Upon release of the clamping screw 19, the table is lowered and the master piece removed. The work pieces are then tested one by one by placing each piece separately on the table and elevating it into contact with both master discs. If the race contour fits either disc, no light will pass at that disc and the work is acceptable as to contour but is at one limit of permissible error. If the piece has its raceway radius in between the radii of the two discs, it is likewise acceptable as to contour and the light streaks will show the condition, one streak being interrupted at the smaller disc and the other streak being crescent shaped. Readings are also taken on the indicators 34 and 68 to show if the piece is acceptable in other particulars.

The reading on the indicator 68 will show a plus or minus diameter of the work as compared to the master piece, as if measured along a horizontal diameter extending through the centers of the gauge discs 10 and 12. The other indicator 34 will show if the location of the contour with respect to the end face of the work is acceptable; its plus or minus reading is an indication, as compared to the master, of the distance from the lower or larger end face of the work resting on the table to the line connecting the centers of the two discs. If the plus or minus reading of either indicator is outside of the allowable tolerances, the piece is rejected. A contour might in itself be acceptable but not at the right location with respect to the end face and the indicator 34 reveals this condition. An otherwise acceptable contour might exist on too large a piece and the indicator 68 reveals this defect. The image thrown on the screen is a band of light of excellent brightness and razor edge sharpness using a 100 watt lamp. The image is so clear and sharp that a low magnification of five to ten is ample to show the conditions at a glance. Extraneous light is suitably excluded from the space between the work and the screen. If desired, the piece can be gauged or inspected at different diameters by turning the piece on its axis to new positions as it lies upon the table. Since the discs function as gauging blades having contoured edges, they can of course be segmental or sector shaped and need not be rotatable; they are however more conveniently made as discs and will wear longer when all parts of the periphery can be used.

We claim:

1. In a machine for inspecting the contoured raceway of a bearing ring, a pair of gauging members spaced apart and having contoured portions for engagement with opposite sides of the raceway in an axial plane of the ring, a movable support engaging the end face of the ring for moving the ring axially and into mating contact with the gauging members, a mounting providing for separation of one gauging member with respect to the other as the ring is moved axially, a diameter indicator responsive to said movement of separation, and an indicator responsive to movement of the support to reveal the location of the raceway with respect to said end face.

2. In a machine for inspecting the contoured raceway extending across the outer periphery of a bearing ring, a master gauging disc positioned radially beyond said outer periphery and having a contoured edge extending in a plane perpendicular to the axis of the disc and in an axial plane of the ring, means for holding the ring against the disc in a position to maintain contact therewith in the plane perpendicular to the axis of the disc and across the outer periphery of the ring, and means for revealing in magnified form the kind of fit between the raceway and the disc.

3. In a machine for inspecting the profile and the location of the curved raceway of a bearing ring, a gauging member having a curved surface representing an acceptable radius for the raceway, a work support engaging the end face of the ring, means for moving the support to carry the ring axially and bring its raceway into mating contact with the curved surface of the gauging member, and means responsive to said axial movement of the ring for indicating the location of the curved raceway with respect to said end face.

4. In a machine for inspecting the curved raceway of a bearing ring, a pair of gauging members spaced apart and having curved surfaces representing maximum and minimum acceptable radii for the raceway, a work support engaging the end face of the ring and movable towards the space between the gauging members to carry the ring into mating contact with the gauging members, a movable mounting providing for separation of one gauging member with respect to the other as the ring is moved against them, and means responsive to said movement of separation to indicate whether the diameter of the ring is acceptable.

5. In a machine for inspecting the profile of a curved raceway on a bearing ring, a gauging member having a curved surface representing an acceptable radius for the raceway, a work support engaging the end face of the ring, means for moving the support to carry the ring axially and bring its curved raceway into mating contact with the curved surface of the gauging member, and means for projecting light past the contacting surfaces to indicate in magnified form the shape of any space existing between the raceway and the gauging member.

6. In a machine for inspecting the profile of a curved raceway on a bearing ring, a pair of gauging members spaced apart and having their peripheral edges curved on different radii to represent maximum and minimum acceptable radii for the raceway, a work support engaging the end face of the ring to hold the raceway in mating relation with the member, means for directing light through any spaces existing between the curved raceway and the similarly curved gauging members, and means for producing magnified images of said spaces for observation.

THEODORE A. OLSON.
JOSEPH KLOPAK.